No. 791,301. PATENTED MAY 30, 1905.
F. STAHL.
SAW GUMMING MACHINE.
APPLICATION FILED NOV. 21, 1904.
2 SHEETS—SHEET 1.
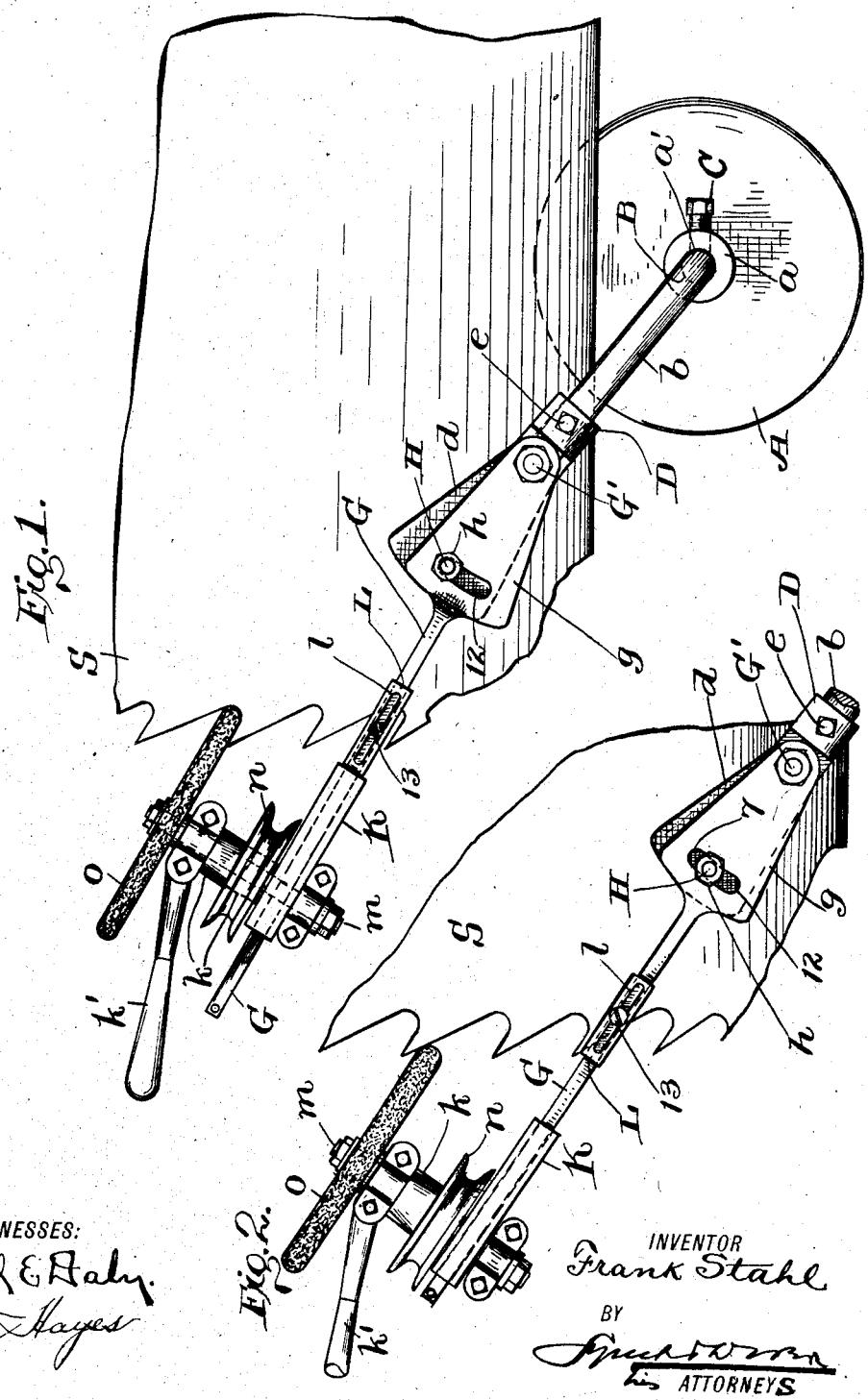
WITNESSES:
Daniel E Daly.
G. M. Hayes.
INVENTOR
Frank Stahl
BY
his ATTORNEYS

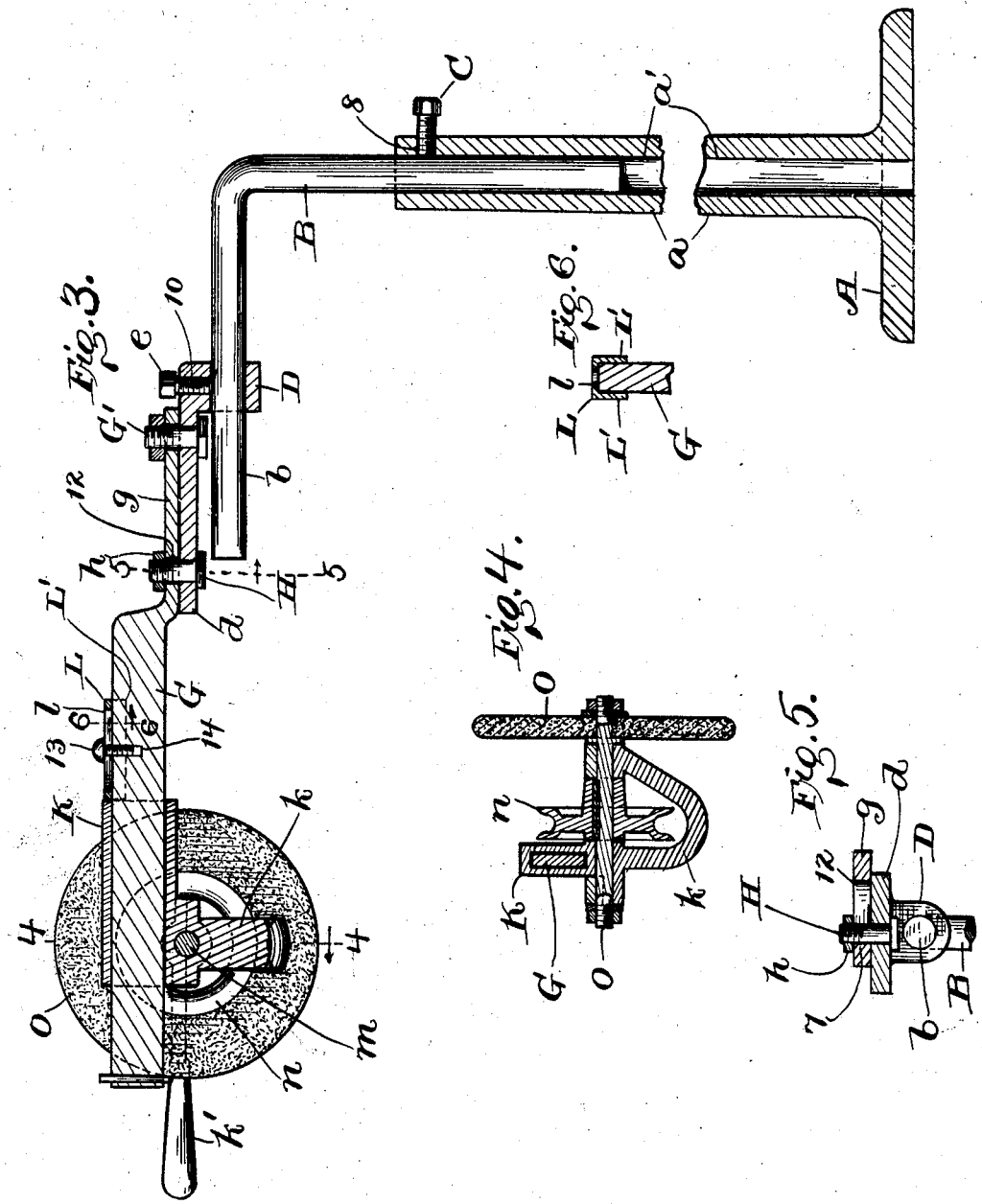

No. 791,301.

Patented May 30, 1905.

UNITED STATES PATENT OFFICE.

FRANK STAHL, OF WESTPARK, OHIO, ASSIGNOR TO THE PETER GERLACH COMPANY, OF CLEVELAND, OHIO, A CORPORATION OF OHIO.

SAW-GUMMING MACHINE.

SPECIFICATION forming part of Letters Patent No. 791,301, dated May 30, 1905.

Application filed November 21, 1904. Serial No. 233,666.

*To all whom it may concern:*

Be it known that I, FRANK STAHL, a citizen of the United States of America, residing at Westpark, in the county of Cuyahoga and State of Ohio, have invented certain new and useful Improvements in Saw-Gumming Machines; and I hereby declare the following to be a full, clear, and exact description of the invention, such as will enable others skilled in the art to which it pertains to make and use the same.

This invention relates to improvements in saw-gumming machines, more especially designed for use in gumming a cylinder or stave saw.

The object of this invention is to provide a saw-gumming machine of the character indicated which is simple and durable in construction, which can be readily applied to and removed from the saw, which comprises a portable standard arranged and placed in position at one side of the cylinder or stave saw to be ground, which is readibly applicable to different sizes of saws, and which is convenient, reliable, and accurate in its operation.

With this object in view and to the end of realizing other advantages hereinafter appearing this invention consists in certain features of construction and combinations of parts hereinafter described, and pointed out in the claims.

In the accompanying drawings, Figure 1 is a top plan of a portion of the cylinder or stave saw and shows my improved saw-gumming machine in full. In this figure the grinding-disk or abrading-wheel of the saw-gumming machine is shown in an operative position relative to the face of a tooth of the saw. Fig. 2 is a top plan of a portion of the saw and saw-gumming machine and shows the abrading-wheel of the said machine in an operative position relative to the back of a tooth of the saw. Fig. 3 is a side elevation of my improved saw-gumming machine, largely in section. Fig. 4 is a vertical section on line 4 4, Fig. 3, looking in the direction indicated by the arrow. Figs. 5 and 6 are vertical sections on lines 5 5 and 6 6, respectively, Fig. 3, looking in the direction indicated by the arrow.

My improved saw-gumming machine comprises a standard having a horizontally-arranged base A and a vertically-arranged column $a$ integral with and arranged vertically centrally of the base A. The column $a$ is provided with a vertical cylindrical bore $a'$, which extends from the upper extremity of the said column to and through the base A. The bore $a'$ is engaged by a correspondingly-arranged and correspondingly-cylindrical post B, which is adjustable vertically and secured in the desired adjustment by a set-screw C, which (see Fig. 3) extends through a corresponding screw-threaded hole 8, formed in the column $a$, into engagement with the post B.

The post B is provided at its upper end with a laterally-projecting horizontally-arranged cylindrical arm $b$, and a correspondingly-arranged sleeve or slide D is mounted on the arm $b$ and adjustable longitudinally of the said arm. Upon loosening the screw C the post B is rendered free to be turned and adjusted vertically, and the said post is secured in the desired adjustment by tightening the said screw. The arm $b$ forms a slideway for the sleeve D, which is secured in the desired adjustment by a set-screw $e$, which extends through a correspondingly-threaded hole 10, formed in the sleeve or slide D, into engagement with the arm $b$. The slide D is provided with a shelf or seat $d$, arranged above and longitudinally of the free end portion of the arm $b$ and extending somewhat beyond the free extremity of the said arm.

A bar G is arranged over and longitudinally of and rests upon the seat $d$ and extends a suitable distance beyond the free extremity of the said seat. The bar G is arranged in the main beyond the free extremity of the seat $d$ and is flattened into the form of a plate $g$ next above the seat $d$. The portion $g$ of the bar G is vertically pivoted near the inner end of the seat $d$ to the said seat, as at G'. The flattened portion *g* of the bar G is provided near the outer end of the seat *d* with a slot 12, arranged concentrically of the pivot G'. A bolt H extends vertically through the seat *d* and through the slot 12 and is arranged with its head next below the under side of the said seat, and a correspondingly-threaded nut *h* is mounted on the shank of the bolt at the upper side of the flattened portion *g* of the bar G.

A slide-forming sleeve K is mounted on and slidable endwise of the bar G between the flattened or widened portion *g* of the said bar and the outer end of the bar. It will be observed, therefore, that the bar G forms a slideway for the slide K. A stop arranged to limit the inward movement of the slide K is provided and consists, preferably, of a plate L, which is mounted upon and adjustable longitudinally of the bar G at the inner end of the travel of the said slide. The plate L has two depending flanges L' and L', arranged at opposite sides, respectively, and next to the bar G, as shown in Fig. 6. The plate L is slotted longitudinally, as at *l*, and a set-screw 13, employed in securing the said plate in the desired adjustment, engages a correspondingly screw-threaded vertical hole 14, formed in the bar G. The screw 13 extends vertically through the slot *l* and is arranged with its head overlapping the upper side of the plate L at the sides of the said slot. The sleeve or slide K is provided at its outer end with a bracket *k*, which affords bearing to a shaft *m*, arranged horizontally and at a right angle to the travel of the said slide. The shaft *m* is operatively provided with a pulley or driving-wheel *n*, to which power is applied in any approved manner. The shaft *m* is also operatively provided with a grinding-disk or abrading-wheel *o*. Preferably the wheel *n* is arranged between the travel of the slide K and the wheel *o*, and the bracket *k* is provided with a handle *k'*, which is attached to the bracket *k* between the wheels *n* and *o* and projects at an angle to the shaft *m* toward and beyond the outer end of the bar G.

Preparatory to the operation of the abrading-wheel of my improved saw-gumming machine the post B, sleeve or slide D, bar G, and stop L are suitably adjusted to bring the abrading-wheel *o* into an operative position relative to the saw-tooth to be operated upon. The adjustability of the post B vertically, the capability of the said post to turn upon rendering it free to be readjusted, and thereby rendering the arm *b* capable of being swung in a horizontal plane, the provision of the adjustable sleeve or slide D, the pivotal connection of the bar G to the said slide, and the provision of the adjustable stop L accommodate a rapid adjustment of the abrading-wheel relative to the saw-tooth to be operated upon.

In Fig. 1 the abrading-wheel *o* is shown in position for operation on the face of a saw-tooth. In Fig. 2 the abrading-wheel is shown in position for operation on the back of a saw-tooth. In the position of the parts shown in Fig. 1 the bolt H engages the end wall 7 of the slot 12, which wall is nearest the abrading-wheel, and the manual power applied to the handle *k'*, because of the diagonal arrangement of the said handle, tends to retain the bar G in position with the end wall 7 of the slot 12 abutting against the bolt H. The nut *h* is not tightened against the flattened portion *g* of the bar G, so that the said bar is free to be swung in a horizontal plane, and the freedom of the said bar G to swing in a horizontal plane is important in moving the abrading-wheel *o* from the face of a tooth into position for operation upon the back of the next forward tooth.

It will be observed that by the engagement of the end wall 7 of the slot 12 with the bolt H uniformity in the pitch of the teeth of the saw is assured and that by the provision of the stop L uniformity in the depth of the interdental spaces of the saw is obtained.

What I claim is—

1. The combination of a post adjustable up and down and capable of being turned upon being rendered free to be readjusted and provided with a laterally-projecting arm; means for securing the post in the desired adjustment; a sleeve or slide mounted on and adjustable endwise of the arm; means for securing the said sleeve or slide in the desired adjustment; a slideway-forming bar supported from the said slide and pivotally attached to the slide to render the bar capable of being swung laterally, which bar extends longitudinally of and beyond the outer end of the aforesaid arm; a sleeve or slide mounted on and slidable endwise of the bar and provided with a bracket; a stop-forming plate mounted on and adjustable endwise of the bar, which plate is arranged at the inner end of the travel of the last-mentioned slide and has two flanges depending at opposite sides respectively of the bar; means for securing the said plate in the desired adjustment, and a shaft supported from the aforesaid bracket and arranged transversely of the last-mentioned slide, which shaft is operatively provided with an abrading-wheel.

2. The combination, with an abrading-wheel, of a slideway-forming bar arranged to swing laterally; a sleeve or slide mounted on and slidable endwise of the bar and supporting the abrading-wheel; a stop arranged to limit the inward movement of the said slide and secured to and adjustable longitudinally of the bar; a seat for the inner end portion of the bar, which seat is adjustable horizontally and vertically; means for securing the said seat in the desired horizontal adjustment; means for securing the said seat in the desired vertical adjustment, and a pivotal connection between the aforesaid bar and the seat to render the said bar capable of being swung laterally.

In testimony whereof I sign the foregoing specification in the presence of two witnesses.

FRANK STAHL.

Witnesses:
C. H. DORER,
B. C. BROWN.